United States Patent [19]

Reck

[11] Patent Number: 4,496,474

[45] Date of Patent: Jan. 29, 1985

[54] ASPHALT EMULSIONS COMPRISING N-ALIPHATIC-1,3-DIAMINOPENTANE EMULSIFIER AND PROCESS

[75] Inventor: Richard A. Reck, Hinsdale, Ill.

[73] Assignee: Akzona Incorporated, Enka, N.C.

[21] Appl. No.: 451,639

[22] Filed: Dec. 20, 1982

[51] Int. Cl.$^3$ .............................................. B01J 13/00
[52] U.S. Cl. ............................ 252/311.5; 106/273 N; 106/277
[58] Field of Search ................ 252/311.5; 106/273 N, 106/277

[56] References Cited

U.S. PATENT DOCUMENTS

| | | | |
|---|---|---|---|
| 2,886,458 | 5/1959 | Ceintrey | 106/277 |
| 3,728,278 | 4/1973 | Tramelli | 252/311.5 |
| 4,260,556 | 4/1981 | Kluger et al. | 260/465.5 R |
| 4,309,374 | 1/1982 | Pollard | 264/115 |

Primary Examiner—Richard D. Lovering
Assistant Examiner—Anne Brookes
Attorney, Agent, or Firm—Francis W. Young; Louis A. Morris

[57] ABSTRACT

A new compound is disclosed having the formula:

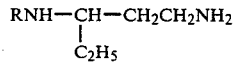

wherein R is a $C_8$ to $C_{22}$ aliphatic group. The new compound is liquid at ambient temperatures and is useful as an asphalt emulsifier. Also disclosed are asphalt emulsions containing said compound.

2 Claims, No Drawings

ASPHALT EMULSIONS COMPRISING N-ALIPHATIC-1,3-DIAMINOPENTANE EMULSIFIER AND PROCESS

BACKGROUND OF THE INVENTION

This invention relates to a new compound, a process for using said compound for making an asphalt emulsion, and the resulting emulsion.

Asphalt emulsions have utility in a variety of protective coating operations such as a permanent protective coating for structures exposed to the atmosphere or sunk into the earth; as an impermeable binder to stabilize porous earth or irrigation ditches, dams, or levies; drilling fluids for oil-well operations and the like; as the main mineral for paving and maintaining roads and highways, and in other similar applications where their particular properties can be utilized.

Bituminous dispersions or emulsions are generally prepared by dispersing molten bitumen, such as asphalt, in or with water in the presence of an emulsifying agent, to form a cationic, anionic or nonionic dispersion depending upon the nature of the emulsifying agent. The cationic dispersions are much more common. Generally such emulsions must meet five important criteria, namely stability, demulsibility, bitumen content, viscosity, and the ability to adhere to aggregate under operating conditions.

To be of practical utility, the cationic emulsifiers must not only make asphalt emulsions which satisfy the foregoing criteria, but also must be capable of being easily handled. A problem associated with the handling of the emulsifiers is the lack of appropriate liquidness to enable the emulsifiers to be stored and pumped at the lower temperatures which are oftentimes encountered in the field. Many useful emulsifiers are pastelike materials under the ambient conditions encountered in the northern states, especially during the early and late stages of the asphalt paving season.

U.S. Pat. No. 3,975,295 is directed toward one alleged solution to the liquidity problem. In said patent a monoamine having the formula $RNH_2$ or a diamine having the formula $RNH\ CH_2—CH_2CH_2NH_2$, wherein R is a long-chain aliphatic group, is used in combination with a lower alkylene oxide adduct of the monoamine. It was previously known that the mono- and diamines containing a long-chain aliphatic group were useful as asphalt emulsifiers. By admixing such amines with the alkylene oxide adduct, supposedly the normally solid mono- or diamine was converted into a homogenous liquid composition at ambient temperatures. Such a formulation has found only limited acceptance in the industry.

Accordingly, there has existed a need for new emulsifiers for use in making asphalt emulsions.

SUMMARY OF THE INVENTION

A new compound has now been discovered which at ambient temperatures is a liquid, having the formula

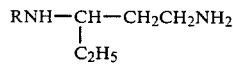

wherein R is A $C_8$ to $C_{22}$ aliphatic group, preferably an alkyl or alkenyl group.

A process for making an asphalt emulsion has also been discovered comprising emulsifying bitumen in water in the presence of an emulsifier of the formula:

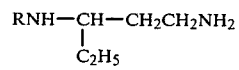

wherein R is a $C_8$ to $C_{22}$ alkyl or alkenyl group.

Additionally, there has been discovered a new asphalt emulsion comprising bitumen emulsified in water, with an emulsifier of the formula:

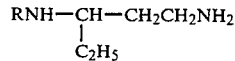

DETAILED DESCRIPTION OF THE PREFERRED EMBODIMENTS

The production of the new compound of the present invention, N-aliphatic-1,3-diaminopentane, may be accomplished by reacting an aliphatic amine, typically an alkyl amine having the formula $RNH_2$ with 2-pentenenitrile which has the formula $CH_3CH_2CH=CHCN$, to form the corresponding nitrile having the formula

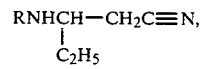

wherein in all instances R is an alkyl or alkenyl group having from 8 to 22 carbon atoms. Subsequently, the nitrile is hydrogenated to form the desired product having the formula

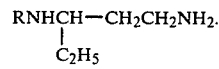

Because of the length of time necessary to fully react the 2-pentenenitrile, it is sometimes desirable to add a quantity of acrylonitrile to the partially reacted mixture to thus obtain as a resulting product, after hydrogenation, a mixture of N-alkyl-1,3-diaminopentane and N-alkyl-1,3-diaminopropane. Generally, the amout of acrylonitrile which is utilized is such that the resulting nitrile mixture, prior to hydrogenation, contains from about 10 to about 40 percent of nitrile having the formula $RNHCH_2CH_2C\equiv N$ and from about 90 to about 60 percent of nitrile having the formula

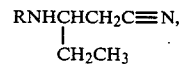

based on the total weight of both nitriles present.

The commercially available 2-pentenenitrile is not pure and typically contains cis-2-pentenenitrile, 2-methyl-2-butenenitrile having the formula

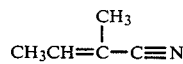

(both cis and trans isomers) as well as 2-methyl-3-butenenitrile having the formula

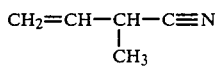

and/or 3-methyl-3-butenenitrile having the formula

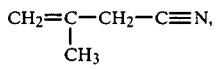

and/or 3-pentenenitrile having the formula $CH_2-CH_2=CH-CH_2-C\equiv N$.

One source of 2-pentenenitrile, Dupont, has published a typical composition as containing, by weight, 71% cis-2-pentenenitrile, 19% 2-methyl-2-butenenitrile, 2% 2-methyl-3-butenenitrile, 1% 3-pentenenitrile, 2% valeronitrile, and 5% cyclohexane. An analysis of 2-pentenenitrile from another source, Rhone Poulene, France, indicated an approximate composition of 76% cis-2-pentenenitrile, 16% cis- and trans-2-methyl-2-butenenitrile, 5% 3-methyl-3-butenenitrile, 0.1–1.0% 3-pentenenitrile, 0.3% valeronitrile, and 0.7% cyclohexane.

Because the 2-pentenenitrile is not pure, the reaction with the alkyl amine and the final products after hydrogenation are isomeric mixtures. However, for purposes of this application and the examples contained herein, the other resulting isomers will all be treated as 2-pentenenitrile derivatives.

The N-aliphatic-1,3-diaminopentane of the present invention may be reacted with propylene oxide in a known manner to produce the desired propylene oxide adduct.

The emulsions of the present invention comprise a bitumen, water, and an emulsifier. The emulsifier is N-aliphatic-1,3-diaminopentane, wherein the aliphatic group is typically an alkyl or alkenyl chain containing from about 8 to about 22 carbon atoms, alone, or in combination with other emulsifiers. The total amount of emulsifier which is used in the emulsion should be sufficient to emulsify the bitumen in the aqueous phase. Typically, the amount of emulsifier is from about 0.1 to 5.0 percent based on the weight of the emulsion.

A typical asphalt emulsifier formulation comprises, by weight, (a) from about 10 to about 90 percent of a compound of the formula:

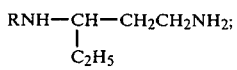

(b) from about 10 to about 90 percent of a compound of the formula:

$RNHCH_2CH_2CH_2NH_2$;

(c) from about 0 to about 80 percent of a compound of the formula $RNH_2$;

(d) from about 0 to about 80 percent of a compound of the formula:

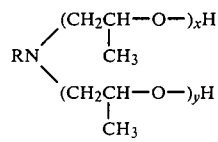

wherein x and y are integers from 0 to 15 and the sum of x+y is from 1 to 15; and (e) from about 0 to about 80 percent of a compound of the formula:

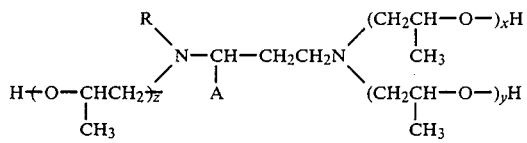

wherein x, y, and z are integers from 0 to 15 and the sum of x+y+z is from 1 to 15, and A is either —H or —$CH_2CH_3$;

wherein in all instances R is a $C_8$ to $C_{22}$ alkyl or alkenyl group.

The amount of bitumen used in the emulsions of the present invention will generally range from about 20 to about 80 percent, based on the weight of the emulsion, preferably from about 50 to about 70 percent. Generally the amount will be 0.2–5% by weight of the total dispersion, and 0.2–1% is generally preferred. For purposes of making a drilling fluid, where vast surface areas must be covered, it is preferrred to use 0.5–5% although the range is generally broader i.e. 0.5–10%.

The term "bitumen" means any naturally occurring or petroleum derived bitumen substance including asphalt, asphaltites, asphaltic pyrobitumens and mineral waxes. Any such bituminous material may be employed to prepare the dispersions of this invention, for instance, natural and petroleum asphalts, air-blown petroleum asphalts, gilsonite, coal tar, oil-gas, pitch, etc. The particles of bitumen in the dispersion may range from about 1 to about 20 microns in size. Such dispersions can be with or without a solvent, such as diesel fuel and toluene, and include cut-back systems.

The preferred bitumen is asphalt of paving grade having a penetration of between 40 and 300 as determined by ASTM test number DS-73, Penetration of Bituminous Materials.

Other additives commonly used in aqueous asphalt emulsions may also be employed in the present invention. Thus, inorganic salts, such as calcium chloride, ammonium chloride, ammonium acetate, ammonium sulfate, sodium sulfate, and the like can be added to the emulsions of the present invention, as in an amount up to about 2 percent, by weight, to prolong the emulsion stability and to improve storage stability. Organic salts, such as fatty amine salts, may also be used, but in all instances the organic or inorganic salts should be water soluble.

The emulsifier of the present invention may be added to the bitumen or to the aqueous phase of the emulsion. Preferably, the emulsifier is added to water in an amount sufficient to produce an aqueous phase containing from about 0.1 to about 5.0 percent, more preferably, from about 0.25 to about 2.0 percent, by weight, of the emulsifier. Hydrochloric acid is typically used to increase the solubility of the emulsifier in the aqueous phase. The resulting solution, to which other additives may be added, can then be utilized to prepare the emulsions of the present invention.

One method of preparing the emulsions of the present invention is to heat the bitumen to a temperature from about 180° F. to about 350° F., preferably about 250° F. and to add thereto a water phase containing the emulsifier of the present invention, as well as any other additives, which was previous formed at a temperature from about 32° F. to 212° F., preferably from about 115° F. to about 125° F. The mixing of the components to form the emulsion is usually accomplished with a high speed, high shear mechanical device, such as a colloid mill. For lower viscosity emulsions, simple mixers or homogenizers may be employed in phase of the colloid mill.

The emulsions resulting from the present invention are characterized by having less graininess than similar prior art emulsions, a low amount of settlement, and improved storage stability.

EXAMPLE I

N-tallow-1,3-diaminopentane is produced by first heating to about 60° C., tallowamine, 5 weight percent $H_2O$, and 5 weight percent $CH_3OH$, with stirring, in a reaction vessel. 2-pentenenitrile is slowly added to the reaction vessel over about 2 hours and the temperature is allowed to rise. After the addition is complete, the reaction mixture is heated to reflux (~86° C. at 1 atm.) and the refluxing is continued for about 48 hours, or until the secondary amine content reaches about 85 percent. The volatiles are then stripped off and the product amine nitrile charged to an autoclave, along with about 1 weight percent Raney nickel and about 1 weight percent filter aid. The autoclave is pressurized with ammonia at room temperature and stirring begun with heating to about 80° C. The ammonia pressure is adjusted to 200 psi, hydrogen then charged to 600 psi, and the temperature increased to 115° C. At that temperature the hydrogen pressure is adjusted to 700 psi and held for 7 to 10 hours or until either the nitrile peak disappears from the IR or until the NE value drops to 185–178. The product is then cooled and pressure filtered. The product has a melting point of about 25° C.

EXAMPLE II

A mixture of N-tallow-1,3-diaminopentane and N-tallow-1,3-diaminopropane is produced by first charging a reactor with 300 pounds of tallowamine, 15 pounds of water, 15 pounds of methanol, and finally with 109 pounds of 2-pentenenitrile. After the nitrile is added, the reaction mixture was digested for about 7.5 hours at 125° C. The pressure developed in the reactor is about 45 psig and the product analyzed to obtain about 22 percent, by weight, of unreacted tallowamine. The acrylonitrile is then added and the mixture digested for about 3.5 hours at 80° C. The pressure developed in the reaction is about 10 psig. The residual unreacted tallowamine is about 2.9 percent, by weight. The product is then stripped of volatiles at a temperature of 74°–80° C., under a vacuum of 21–24 inches of mercury, for about 1.75 hours. The stripped product is hydrogenated utilizing 18 pounds of ammonia, 7–18 pounds of Raney nickel, and 7.7 pounds of filter aid. After the ammonia is added, the pressure is 220 psig at 80° C. 1720 standard cubic feet of hydrogen is added at 600 psig at 115° C. and the reaction continued for 13.5 hours. The resultant product is analyzed to contain about 70 percent N-tallow-1,3-diaminopentane, 24 percent N-tallow-1,3-diaminopropane, and 6 percent tallowamine, all based upon the total weight of the three components. The melting point of the product is about 30° C.

EXAMPLE III

Following the same general procedure as in Example II, a product is obtained containing approximately 55 percent N-tallow-1,3-diaminopentane, 21 percent N-tallow-diaminopentane, and 15 percent tallowamine, all based upon the total weight of the three components.

EXAMPLE IV

To demonstrate the utility of the present invention in making asphalt emulsions, standard asphalt emulsion testing was employed in accordance with ASTM D-244 for cationic emulsion to meet ASTM specification D-2397.

The emulsifier formulations were first prepared by mixing the appropriate amounts of the individual components and the physical appearance of the formulations noted.

The results are shown in Table I wherein the contents of the emulsifier formulations are shown as percent, by weight. In the table, the new compound of the present invention N-tallow-1,3-diaminopentane is shown as the product of Example II in which it was produced in combination with N-tallow-1,3-diaminopropane. Duomeen ®T is Armak Company's trademark for commercial grade N-tallow-1,3-diaminopropane, Armeen ®T is Armak Company's trademark for commercial grade tallowamine, and Proparmeen ®T/12 is Armak Company's trademark for a commercial grade of a two mole propylene oxide adduct of tallowamine.

In making the emulsions, the aqueous phase contained 0.18 percent of the emulsifier formulation and 0.10 percent hydrochloric acid. The emulsions were prepared by use of a colloid mill using as the bitumen Chevron 120/150 penetration asphalt. The total solids content is shown in the table, along with the viscosity in 557 at 122° F., as well as the pH of the emulsion. The quality of the emulsion after 24 hours is also noted.

TABLE I

| PRODUCT OF EXAMPLE II | Duomeen ® T | Armeen ® T | Propoduomeen ® T/12 | CHARACTER OF EMULSIFIER | EMULSION % SOLIDS | EMULSION VISCOSITY/pH | EMULSION CHARACTER |
|---|---|---|---|---|---|---|---|
|  | 50 |  | 50 | soft paste | 64.4 | 109/2.6 | smooth, no settlement |
|  |  |  |  |  | 64.8 | 400+/2.6 |  |
|  | 42 | 41 | 17 | soft paste | 62.6 | 109/1.9 | smooth, no settlement |
|  |  |  |  |  | 64.4 | 400+/1.9 |  |
| 42 |  | 41 | 17 | clear amber liquid | 65.0 | 204/2.4 | very smooth, no settlement |
|  |  |  |  |  | 66.8 | 400+/2.4 |  |
| 50 |  |  | 50 | clear yellow liquid <1% settlement | 66.4 | 140/1.7 | smooth, no settlement |

TABLE I-continued

| PRODUCT OF EXAMPLE II | Duomeen® T | Armeen® T | Propoduomeen® T/12 | CHARACTER OF EMULSIFIER | EMULSION % SOLIDS | EMULSION VISCOSITY/pH | EMULSION CHARACTER |
|---|---|---|---|---|---|---|---|
| 100 | | | | clear yellow liquid <1% settlement | 69.4 | 400+/1.7 | smooth, no settlement |
| | | | | | 65.4 | 218/1.97 | |
| | | | | | 67.6 | 321/1.97 | |
| | | | | | 70.4 | 400+/1.97 | |

EXAMPLE V

Following the procedure of Example IV, emulsifier formulations and asphalt emulsions were prepared, as shown in Table II. The asphalt used was Chevron 150/200 penetration at 250° F. and the amount of hydrochloric acid used was approximately 0.25%, adjusted to give a pH of 1.8. Otherwise, the procedure used was the same as in Example IV.

1. A process for making an asphalt emulsion comprising emulsifying bitumen in water in the presence of an emulsifier of the formula:

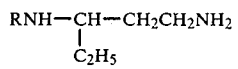

wherein R is tallow.

TABLE II

| PRODUCT OF EXAMPLE II | Duomeen® T | Armeen® T | Proparmeen® T/12 | Propoduomeen® T/12 | EMULSION % SOLIDS | EMULSION VISCOSITY/pH | EMULSION CHARACTER |
|---|---|---|---|---|---|---|---|
| | 42 | 41 | | 17 | 66.6 | 180/1.8 | smooth |
| | | | | | 69.6 | 400+/1.8 | creamy |
| | | | | | 70.0 | 400+/1.8 | no grain |
| | 84.7 | 15.3 | | | 66.8 | 143/1.8 | smooth |
| | | | | | 68.4 | 367/1.8 | creamy |
| | | | | | 69.6 | 400+/1.8 | no grain |
| 100 | | | | | 63.2 | — | smooth |
| | | | | | 67.2 | 87/1.8 | creamy |
| | | | | | 71.2 | 400+/1.8 | no grain |
| 70 | | | 15 | 15 | 67 | 89/1.8 | smooth |
| | | | | | 68 | 105/1.8 | creamy |
| | | | | | 72 | 400+/1.8 | no grain |
| 36 | 21 | 26 | | 17 | 65 | 40/1.8 | smooth |
| | | | | | 66 | 56/1.8 | creamy |
| | | | | | 72 | 400+/1.8 | no grain |

EXAMPLE VI

The procedure of Example V was followed except the bitumen was Chevron 150/200 penetration at 250° F. and approximately 0.25% hydrochloric acid was used to adjust the pH to about 1.6.

2. An asphalt emulsion comprising bitumen emulsified in water, with a liquid emulsifier of the formula:

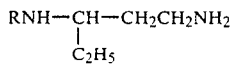

TABLE III

| PRODUCT OF EXAMPLE II | Proparmeen® T/12 | EMULSION % SOLIDS | EMULSION VISCOSITY pH | EMULSION CHARACTER |
|---|---|---|---|---|
| 70 | 30 | 66.8 | 39.7/1.6 | separation and settlement |
| | | 68.0 | 104.9/1.6 | no separation or settlement |
| | | 70.0 | 336.9/1.6 | no separation or settlement |

I claim:

wherein R is tallow.